(12) United States Patent
Murray (10) Patent No.: US 8,851,547 B2
(45) Date of Patent: Oct. 7, 2014

(54) COMPACT SEATING ARRANGEMENT

(75) Inventor: Ian Gordon Murray, Puttenham (GB)

(73) Assignee: Gordon Murray Design Limited, Shalford (GB)

( * ) Notice: Subject to any disclaimer, the term of this patent is extended or adjusted under 35 U.S.C. 154(b) by 0 days.

(21) Appl. No.: 13/569,679

(22) Filed: Aug. 8, 2012

(65) Prior Publication Data

US 2012/0299326 A1 Nov. 29, 2012

Related U.S. Application Data

(63) Continuation of application No. 12/530,995, filed as application No. PCT/GB2008/000892 on Mar. 14, 2008, now Pat. No. 8,267,456.

(30) Foreign Application Priority Data

Mar. 15, 2007 (GB) .................................. 0704966.1

(51) Int. Cl.
 *B60N 2/01* (2006.01)
 *B60N 2/36* (2006.01)
(52) U.S. Cl.
 CPC ... *B60N 2/01* (2013.01); *B60N 2/36* (2013.01)
 USPC .......................................... 296/64; 296/65.01
(58) Field of Classification Search
 USPC ............... 296/64, 65.06, 65.07, 65.13, 65.01; 297/344.12, 344.24, 244.25
 See application file for complete search history.

(56) References Cited

U.S. PATENT DOCUMENTS

| 2,190,218 | A | | 2/1940 | Paton |
| 2,839,312 | A | | 6/1958 | Barenyi et al. |
| 3,175,637 | A | * | 3/1965 | Honda .......................... 180/346 |
| 3,352,597 | A | | 11/1967 | Barenyi |

(Continued)

FOREIGN PATENT DOCUMENTS

| CN | 1840407 A | 10/2006 |
| DE | 29518853 U1 | 2/1997 |

(Continued)

OTHER PUBLICATIONS

Japanese Office Action; English Translation; Application No. 2009-553211; Jan. 29, 2013.

(Continued)

*Primary Examiner* — Jason S Morrow
(74) *Attorney, Agent, or Firm* — Westman, Champlin & Koehler, P.A.; Z. Peter Sawicki; Amanda M. Prose (57) ABSTRACT

A seating arrangement for a vehicle having at least three seats, comprising two rear passenger seats aligned substantially transversely, and a driver's seat arranged substantially centrally and in front of said two rear passenger seats. The driver's seat extending rearward beyond the front of the legs of the rear passengers when seated in the passenger seats. The seats being arrangeable in multiple configurations: a three-seat configuration with a storage space behind the passenger seats, a two-seat configuration with one of the passenger seats folded down to extend said storage space and a one-seat configuration in which both passenger seats are folded down to extend further said storage space. A vehicle engine is mounted in a space beneath said storage space behind the passenger seats and/or beneath the passenger seats and a fuel tank, batteries or other power source is mounted beneath the driver's seat.

10 Claims, 5 Drawing Sheets

(56) References Cited

U.S. PATENT DOCUMENTS

| | | | |
|---|---|---|---|
| 4,160,534 A | 7/1979 | White | |
| 4,489,972 A | 12/1984 | Monzini | |
| 5,116,097 A | 5/1992 | Bulgari | |
| 5,538,309 A | 7/1996 | Murray | |
| 6,253,865 B1 * | 7/2001 | Suzuki | 180/65.25 |
| 6,629,721 B1 | 10/2003 | Macey | |
| 7,380,859 B2 | 6/2008 | Gardiner | |
| 8,398,160 B2 * | 3/2013 | Baumann | 296/210 |
| 2009/0072572 A1 | 3/2009 | Scheinberg | |
| 2010/0187850 A1 | 7/2010 | Murray | |
| 2013/0062939 A1 * | 3/2013 | Engler et al. | 307/10.1 |

FOREIGN PATENT DOCUMENTS

| | | | |
|---|---|---|---|
| EP | 547953 A1 * | 6/1993 | |
| EP | 0634302 A1 | 1/1995 | |
| EP | 1600326 A1 | 11/2005 | |
| FR | 2677601 A1 | 12/1992 | |
| GB | 177857 A | 3/1922 | |
| GB | 190040 A | 12/1922 | |
| GB | 1012559 A | 12/1965 | |
| GB | 1301705 A | 1/1973 | |
| GB | 2282576 A | 4/1995 | |
| GB | 2462217 A | 2/2010 | |
| JP | 52043223 A | 4/1977 | |
| JP | 57205239 A | 12/1982 | |
| JP | 59177357 U | 11/1984 | |
| JP | 61044329 | 3/1986 | |
| JP | 10007018 A | 1/1998 | |
| JP | 2007106321 A | 4/2007 | |
| WO | 9218347 A | 10/1992 | |

OTHER PUBLICATIONS

GB Re-Examination Report; GB1011541.8; May 26, 2011.
Mexican Office Action; MX/a/2009/009646; Jun. 20, 2012.
Chinese Office Action 2; 200880008399.0.
Chinese Office Action 1; 200880008399.0; Sep. 1, 2011.
GB Search and Examination Report; GB1011544.2; Sep. 14, 2010.
GB Search and Examination Report; GB1011546.7; Sep. 22, 2010.
GB Search and Examination Report; GB1011541.8; Oct. 12, 2010.
PCT International Search Report, May 26, 2009.
PCT Written Opinion of the International Searching Authority.
Mexican Office Action: MX/a/2009/009646; Feb. 14, 2013.

* cited by examiner

COMPACT SEATING ARRANGEMENT

CROSS-REFERENCE TO RELATED APPLICATION

This application is a Continuation Application of application Ser. No. 12/530,995, filed Mar. 5, 2010, now U.S. Pat. No. 8,267,456, issued Sep. 18, 2012 which is a Section 371 National Stage Application of International Application No. PCT/EP2008/000892, filed Mar. 14, 2008 and published as WO 2008/110814 A2 on Sep. 18, 2008, which is claims priority to application No. 0704966.1 filed Mar. 15, 2007 in Great Britain, the contents of which are hereby incorporated by reference in their entirety.

FIELD OF THE INVENTION

This invention relates to a compact seating arrangement for a vehicle, in particular comprising a central driving seat and two rear passenger seats aligned substantially transversely.

BACKGROUND OF THE INVENTION

A variety of seating arrangements comprising a central driver's seat and two rear passenger seats have previously been proposed but these have tended to suffer from various practical limitations or inconveniences so have not been widely adopted. In more recent years, such a seating arrangement for a sports car has been described in WO9218347 by the inventor of the present case and the seating arrangement used in the McLaren F1 (trade mark) sports car was based upon this.

The present invention seeks to develop this concept further to provide a more compact seating arrangement suitable for use in a compact vehicle.

Compact vehicles tend to suffer from compromised driver ergonomics because the front wheel arch intrudes into the passenger cabin. This is the case for both left-hand and right-hand drive vehicles. The present invention also seeks to provide a compact seating arrangement for a vehicle, which provides better ergonomics for the driver.

SUMMARY OF THE INVENTION

According to a first aspect of the invention there is provided a seating arrangement of a vehicle, wherein the seating arrangement has at least three seats, and comprising two rear passenger seats aligned substantially transversely, and a driver's seat arranged substantially centrally and in front of said two rear passenger seats. The driver's seat extends rearward beyond the front of the legs of the rear passengers when seated in the passenger seats. The seats are arrangeable in multiple configurations: a three-seat configuration with a storage space behind the passenger seats, a two-seat configuration with one of the passenger seats folded down to extend said storage space and a one-seat configuration in which both passenger seats are folded down to extend further said storage space and wherein a vehicle engine is mounted in a space beneath said storage space behind the passenger seats and/or beneath the passenger seats and a fuel tank, batteries or other power source is mounted beneath the driver's seat.

Typically, the driver's seat comprises a seat base on which a driver sits and a seat back for supporting a driver's back; a space or a cut-out being provided on each side of the seat base and/or of the seat back of the driver's seat to allow the innermost leg of each of the passengers to overlap (both transversely and longitudinally) with the position of the driver's seat.

It would be possible for a common rear bench seat to be provided in which said two rear passenger seats are formed. Alternatively, two separate rear passenger seats may be provided.

In either case, the arrangements of the seats is such that advantage can be taken of the fact that the human passenger generally has a wider trunk or body than legs, and specifically has shoulders of greater width than the width of the legs. This enables passengers to be comfortably seated on the respective rear seats with the front driver's seat overlapping the legs of the passengers. This overlapping arrangement enables the cabin of a vehicle to be kept relatively narrow and yet provide accommodation for the driver and for at least two passengers sat side by side.

According to a further first aspect of the present invention there is provided a seating arrangement for a vehicle, said seating arrangement having at least three seats and comprising two rear passenger seats aligned substantially transversely, and a driver's seat arranged substantially centrally and in front of said two rear passenger seats, wherein said front driver's seat extends transversely to overlap part of each said rear passengers legs. The amount of the overlap will depend upon the relative sizes of the said passengers.

The present invention also extends to a vehicle incorporating a seating arrangement as defined above.

In a preferred embodiment, the vehicle has an engine which is disposed substantially to the rear of the passenger compartment.

Other preferred and optional features of the invention will be apparent from the subsidiary claims and from the following description.

BRIEF DESCRIPTION OF THE DRAWINGS

The invention will now be further described, merely by way of example, with reference to the accompanying drawings, in which.

DETAILED DESCRIPTION OF ILLUSTRATIVE EMBODIMENTS

Figure 1:
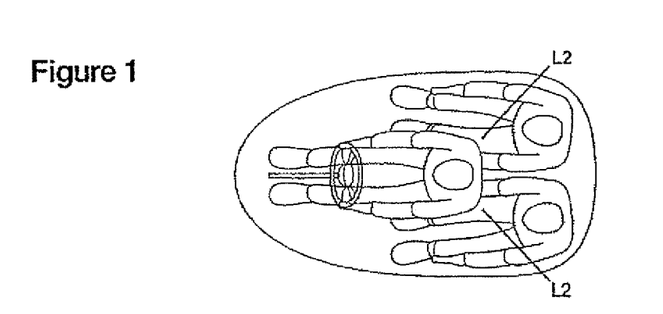
FIG. 1 shows schematically a plan view of a first embodiment of a compact seating arrangement according to the present invention with the occupants (a driver and two passengers) shown therein.
Figure 2:
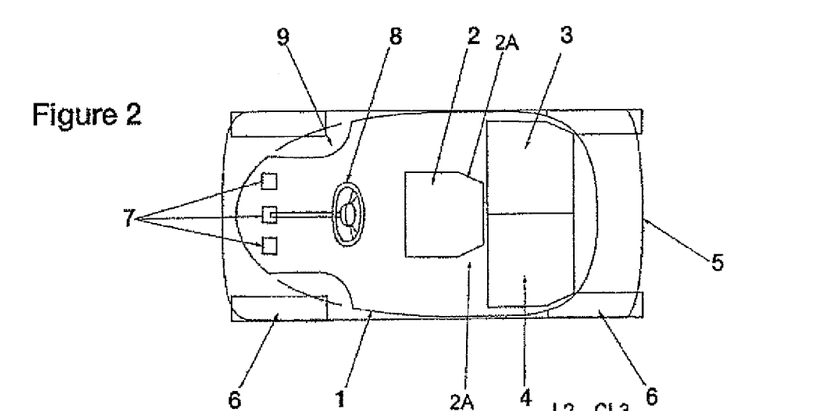
FIG. 2 shows a schematic plan view from above of a vehicle incorporating the seating arrangement of FIG. 1 (without the occupants)
Figure 3:
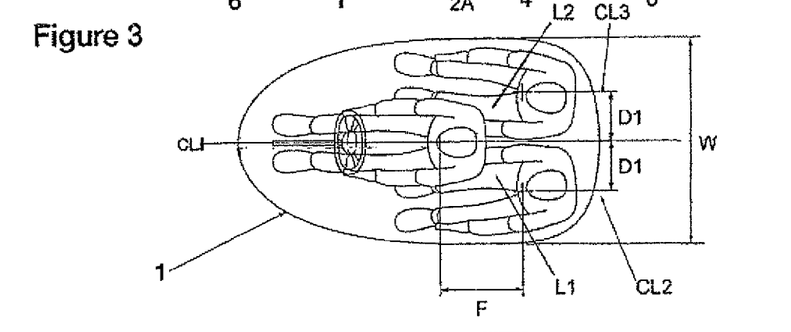
FIG. 3 is a schematic plan view similar to FIG. 1 with various dimensions marked thereon.

FIGS. 1 to 3 show schematic plan views of a cabin 1 of a vehicle, showing the first embodiment of a compact seating arrangement therein. As will be seen, there is a single, centrally arranged driver's seat 2 and two rear passenger seats 3 and 4 which are aligned substantially transversely. Although the driver's seat 2 is arranged generally in front of the two rear passenger seats, the driver's seat 2 extends transversely to overlap part of each rear passenger legs L1, L2. The driver's seat is shaped at 2A to provide accommodation for at least a part of the inboard leg of each passenger (as shown in FIGS. 1 and 3). The three seat arrangement shown in FIGS. 1 to 3 is comfortable and provides easy access to the seats 2, 3 and 4 for all of their occupants. The seating arrangement is such as to keep the overall width and length taken up by the seats 2, 3 and 4 as small as possible. This compact arrangement is achieved, whilst also providing the necessary space and comfort for the occupants, by utilising the fact that the shoulders and hips of a human, or the trunk generally, is wider than the legs. It is therefore possible to seat a person comfortably behind the driver and provide room for the rear passengers to extend their legs to either side of the driver. The overall vehicle width W can thus be limited to around 1250 mm-1400 mm (see FIG. 3).

FIG. 2 shows a plan view of a vehicle incorporating the seating arrangement of FIG. 1. As described, two rear seats 3 and 4 are provided rearward with respect to the driver's seat 2. FIG. 2 also shows the body 5 of the car, together with its wheels 6. It will be seen that the central position of the driver's seat 2 enables this seat 2 to be aligned with control pedals 7 and a steering wheel 8. Thus, as indicated in FIG. 2, even where the car is made to be mid-engined, having its engine (not shown) immediately to the rear of the passenger compartment, and the driver relatively forwardly, the driver's seat 2 is aligned with the controls 7, 8 and is not offset (as it would be in a conventional compact car). It will also be appreciated that in the forward central position the ergonomics of the seat for the driver are enhanced as compared with known two-seater and four-seater cars, and the field of vision for the driver is greatly enhanced. In this respect, it is also possible to ensure that there is minimum intrusion into the driver's field of vision.

As will be seen from FIG. 2, the central position for the driver means that there is no need to restrict or otherwise compromise on the positioning and size of the front wheel arches 9. This also means that the wheel lock available, and the consequent turning circle, can be chosen as required.

The central driver's position thus avoids problems normally associated with two-and-four-seater cars, for example, caused by the front wheel arches 9 intruding into the passenger cabin. The central driving position also makes it unnecessary to provide left and right hand drive versions. In addition, the seating arrangement shown in FIGS. 1 to 3 enables these advantages of a central driving position to be achieved without having to substantially increase the width of the passenger cabin 1.

As indicated above, the passenger cabin 1 preferably has a maximum width W of around 1250 mm-1400 mm. This compares favorably with the width of currently available two/four seat compact cars, for example, a Smart fortwo (trade mark) (two seater) is 1559 mm wide, whilst the Citroen C1 (trade mark) (four seater) is 1630 mm wide. The central driver's seat 2 is preferably offset forwardly of the two rear passenger seats 3 and 4 by a distance F, e.g. of around 350 mm-450 mm (see FIG. 3). By this means, the trunk of each passenger is kept to the rear of the driver for comfort and to avoid interference by the passengers with the driver's visibility, whilst the passengers can extend their legs to the sides of the driver.

The centrally positioned, front driver's seat and passenger seat layout described above keeps the overall width of the cabin restricted. The amount of the lateral overlap of the seats will depend upon the relative sizes of the seats, their shapes and the like. The distance D1 between the centre line CL1 of the central driver's seat 2 and the centre lines CL2, CL3 of each rear passenger seats 3 and 4 is preferably in the range 250 mm-400 mm but most preferably in the range 280 mm-380 mm (see FIG. 3).

Figure 4:
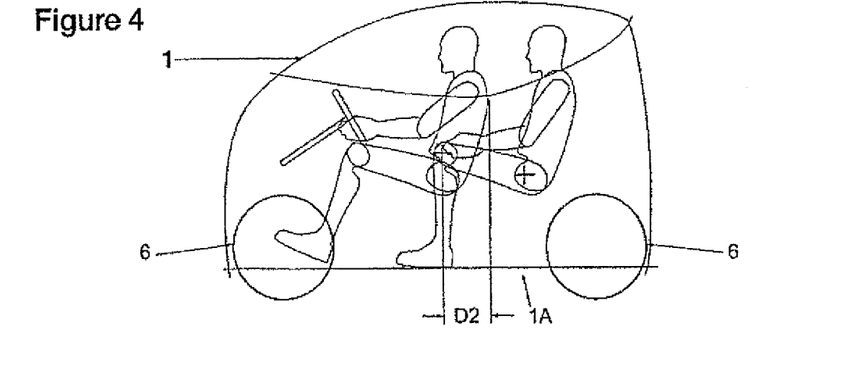
FIG. 4 is a schematic side view of a vehicle as shown in FIG. 2 with the occupants shown.

It will be appreciated that although the driver's 2 seat is forward of the two passenger seats 3, 4, the tops of the three seats, supporting the heads of the occupants, are in a similar part of the passenger cabin 1 so that it is a simple matter to provide sufficient headroom at that position (see FIG. 4).

Figure 5:
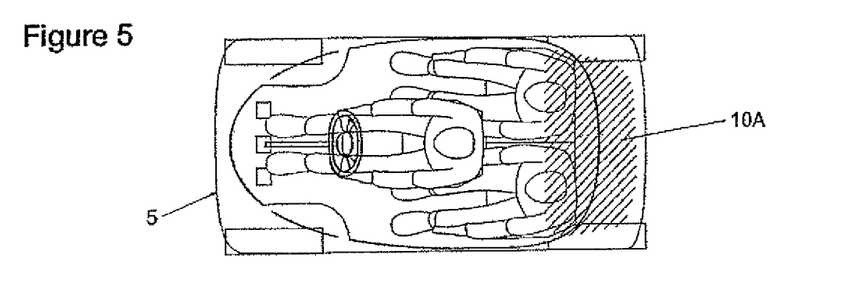
FIGS. 5, 6 and 7 are schematic plan views illustrating three possible configurations for the seating arrangement shown in the preceding figures.
Figure 6:
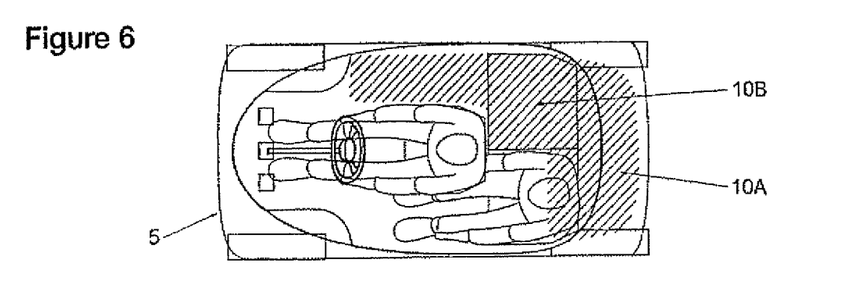
Figure 7:
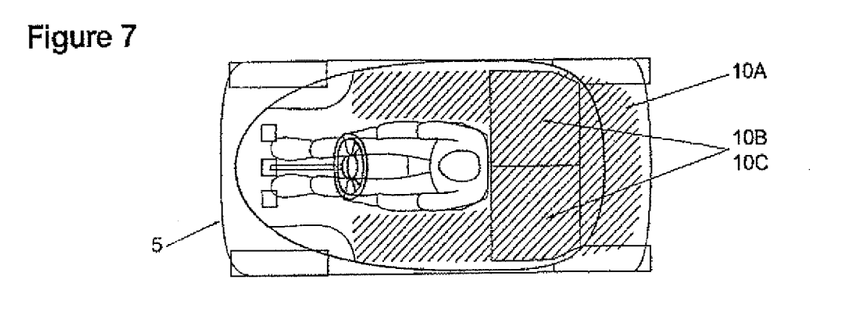

As shown in FIGS. 5, 6 and 7, this seating arrangement also enables easy access to the passenger seats, which in turn provides a flexible load carrying capacity. The passenger seats 3, 4 can be folded down together or individually to provide increased storage capacity. FIG. 5 shows a three seat configuration with a boot space 10A behind the passenger seats 3, 4. FIG. 6 shows a two seat configuration with one passenger seat folded down with storage space 10A, 10B in the boot and in the cabin. FIG. 7 shows a driver's seat configuration only, with two passenger seats folded down, with storage spaces 10A, 10B, 10C in the boot and in the cabin. The areas available for storage are shown shaded in FIGS. 5-7.

Figure 8:
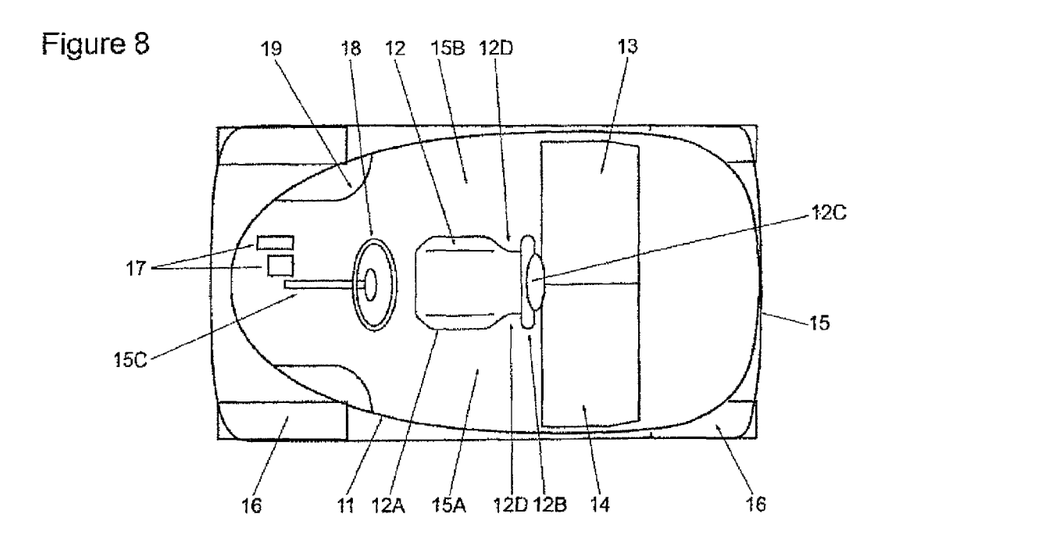
FIG. 8 is a schematic plan view of a vehicle incorporating a second embodiment of a seating arrangement according to the present invention.

FIGS. 8-15 illustrate a second embodiment of a seating arrangement according to the invention. This is similar to the arrangement shown in FIGS. 1-7 but with some small changes in the various dimensions of the layout. FIGS. 8-15 also show features of the seats and the positions of the occupants therein in a little more detail. FIG. 8 shows a plan view of a vehicle incorporating this seating arrangement and shows a cabin 11, a driver's seat 12, two rear passenger seats 13, 14, the body 15 of the vehicle, its wheels 16, control pedals 17, a steering wheel 18 and front wheel arches 19.

As shown in FIG. 8, the driver's seat comprises a seat base 12A, a seat back 12B and a headrest 12C. Rearward portions of the seat base 12A, on each side thereof, are shaped, e.g. by the provision of a cut-out 12D to provide a space to accommodate at least part of a leg of a passenger seated in a rear passenger seat. By this means, the seat base 12A enables the rear seats 13, 14 (and the inboard leg of a passenger seated therein) to overlap in the lateral direction, e.g. so that the inboard knee of a passenger lies, at least partially, beneath one of the driver's shoulders. The inboard shoulder of each passenger thus lies inboard of one of the driver's shoulders, as shown in FIG. 9.

Figure 9:
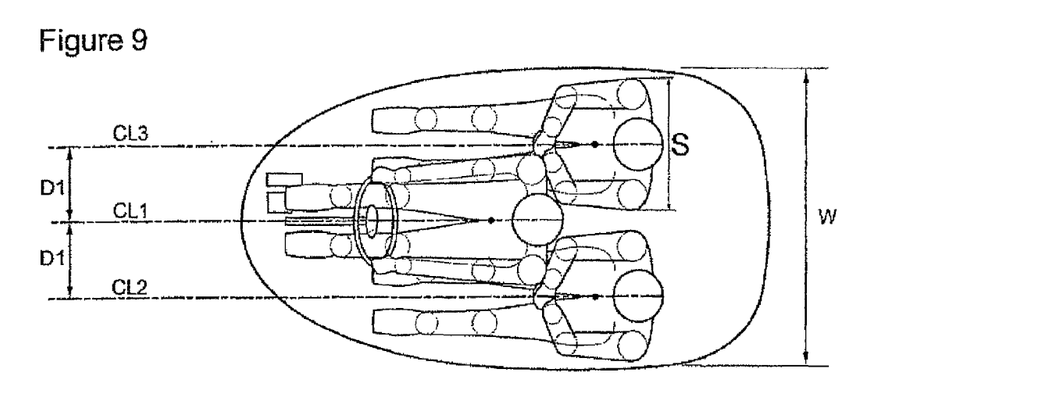
FIG. 9 is a schematic plan view showing occupants in the seating arrangement shown in FIG. 8.

In the arrangement shown in FIG. 9, the spacing D1 between the centre line CL1 of the driver's seat 12 and the centre lines CL2, CL3 of the passenger seats 13, 14 is around 280-380 mm (which is slightly greater than that shown in the first embodiment). The overall external width W of the vehicle can, however, still be kept to around 1250 mm-1400 mm or less.

The internal width of the cabin will be less than 1400 mm, and preferably less than 1200 mm. The internal width should, however, preferably be at least 1040 mm to accommodate the shoulders of typical adult passengers side by side (in the extreme case that their shoulders are just touching). The width S of an adult occupant's shoulders typically lies in the range 450 mm to 520 mm, this preferably being greater than the lateral spacing D1 of the centre lines of the seats so that the passenger's inboard shoulder lies behind or inboard of one of the driver's shoulders, i.e. so the inboard shoulders of the passengers are spaced from each other by a distance less than S. The lateral spacing D1 should also preferably be greater than or equal to the width S so that the inboard shoulders of the passengers are spaced from each other (or at worst, are adjacent each other). A preferred relationship between D1 and S can thus be stated as:

$$S/2 <= D1 < S.$$

Figure 10:
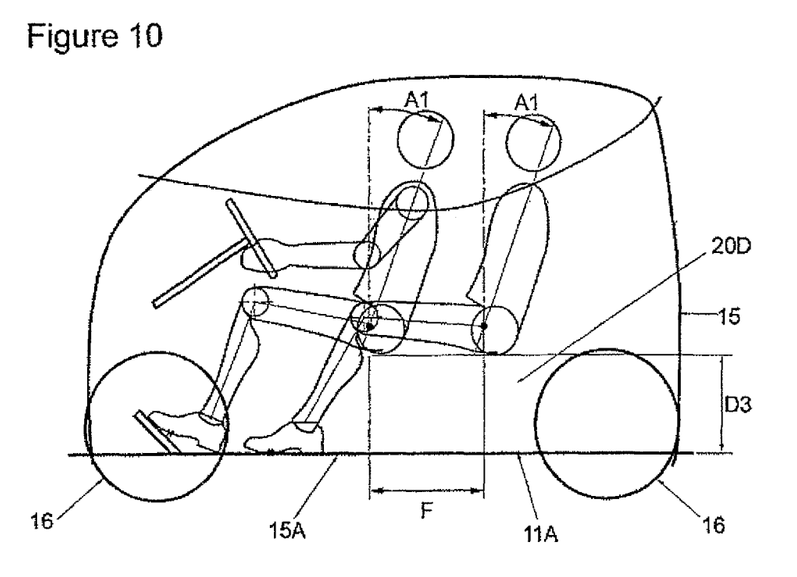
FIG. 10 is a schematic side view of the vehicle of FIG. 8 with the occupants shown.

FIG. 10 shows a side view of the vehicle shown in FIG. 9. As shown in this Figure (and in FIG. 4 described above), the driver's seat and the passenger seats are arranged so that the occupants are seated in a relatively upright position. The seat backs are angled so that they (and the backs of the occupants) are inclined to the vertical at an angle A1, e.g. of around 20 degrees. This angle may be varied to some extend but is preferably less than 30 degrees and most preferably less than 25 degrees.

Figure 11:
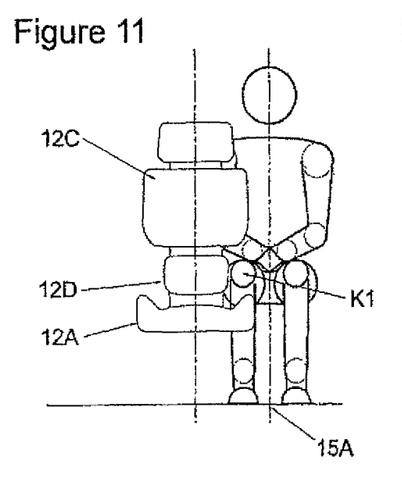
FIG. 11 is a schematic front view of the second embodiment illustrating the lateral overlap between the driver's seat and a passenger leg.

The seat base of each of the seats is also spaced from the floor 11A of the cabin so that the occupants are seated in a relatively high position. The distance D3 between the upper surface of the seat base 12A which supports the occupant and the floor 11A is preferably in the range 400-500 mm. The occupants' lower legs thus typically make an angle with the vertical of 30 degrees or less, and preferably 25 degrees or less. FIG. 11 shows a front view of the driver's seat 12 (with no occupant) and a passenger seated in one of the rear seats. As shown, the seat back 12B has two main parts: an upper, relatively wide portion 12C for supporting the occupant's upper back and shoulders and a lower relatively narrow portion 12D for supporting the occupant's lower back. As illustrated in the Figure, the passenger's inboard knee K1 overlaps laterally with the driver's seat and is accommodated in a space to the side of the lower seat back portion 12D. Thus, the driver's seat is shaped to enable the passenger's inboard knee K1 to overlap with the driver's seat in the longitudinal direction (as shown in FIGS. 8-10) and in the lateral direction (as shown in FIG. 11).

The wide portion 12C of the seat back typically has a width in the range 400-500 mm (which is preferably similar to, or slightly less, than the width of the occupant's shoulders) and the narrow portion 12D typically has a width in the range 150-300 mm. The space for accommodating the passenger's knee K1 preferably extends laterally into each side of the seat back 12B by at least 50 mm and preferably by at least 100 mm. As shown, the seat base 12A (except between the rear cut-outs 12D) has a width similar to that of the wide portion 12C of the seat back.

Figure 12:
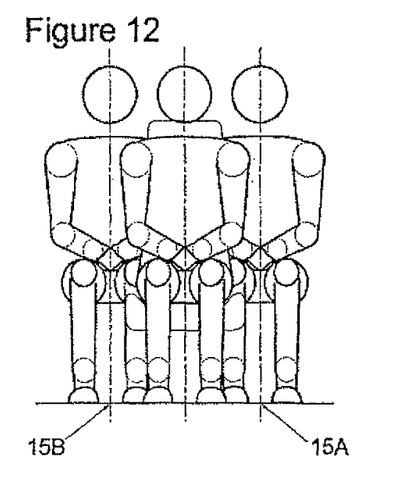
FIG. 12 is a schematic front view corresponding to FIG. 11 but with all three occupants shown.

FIG. 12 is a front view of the driver and two passengers sitting in the seating arrangement illustrated in FIGS. 8-11. This shows how the passengers' trunks (upper body) overlap in a lateral direction with the driver's trunk.

Figure 13:
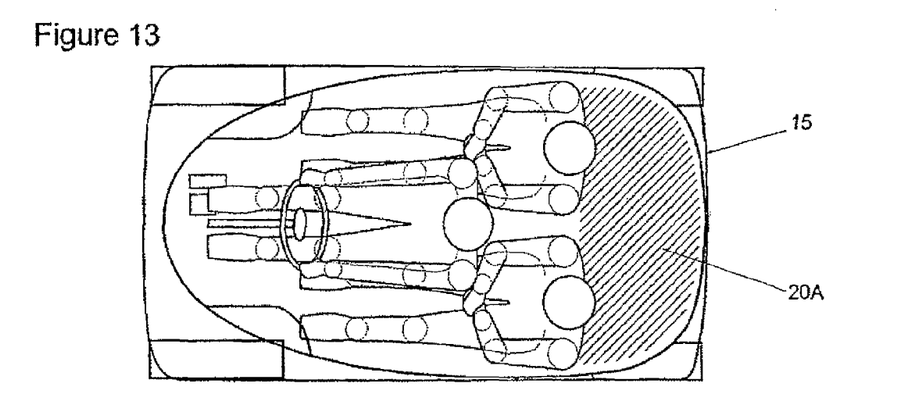
FIGS. 13 to 15 are schematic plan views of three possible configurations of the seating arrangement shown in FIG. 8.
Figure 14:
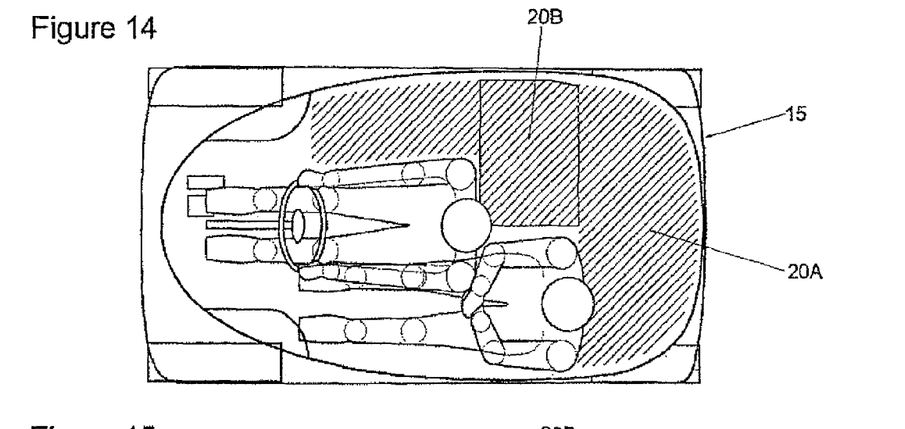
Figure 15:
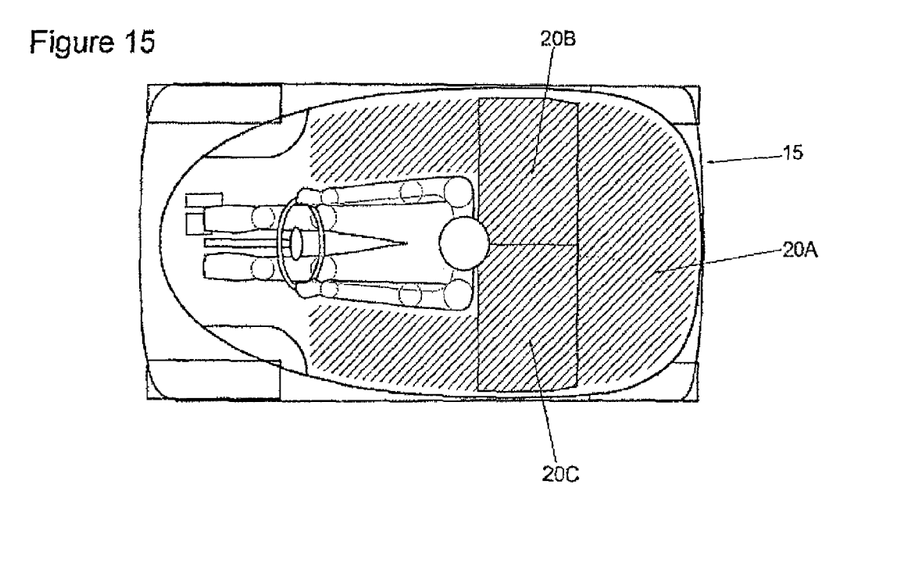

FIGS. 13-15 illustrate three possible configurations of the seating arrangement described above. FIG. 13 shows a storage space 20A behind the passenger seats. The back rests of the passenger seats 13, 14 can be folded down to a substantially horizontal position. In FIG. 14, one is folded down to create further storage space 20B and in FIG. 15, both are folded down to create additional storage spaces 20B and 20C. The areas available for storage are again shown shaded in FIGS. 13-15. In further arrangements (not shown) a child seat may be secured on one or both of the passenger seats.

As shown in FIGS. 4 and 10, the passengers' knees overlap with the driver's body and the driver's seat to some extend as indicated by the distance D2 (see FIG. 4). The size of this distance will depend on the longitudinal position of the driver's seat and the size of the passenger but will typically be in the range of 50 mm-300 mm. The longitudinal position of the driver's seat 12 is adjustable so the driver can adjust his or her position relative to the control pedals 7 and steering wheel 8 as required. As shown in FIGS. 2 and 8, the driver's seat 2, 12 is located just forward of the passenger seats 3, 4, 13, 14. In a preferred arrangement, the rear of the driver's seat base 12A and/or the driver's seat back 12B is located close to the front of the passenger seats 13, 14 (when viewed from above as in FIGS. 2 and 8). If the driver's seat 12 is adjusted forwards, the space between the driver's seat 12 and the passenger seats 13, 14 increases, e.g. by up to 200 mm, and if it is adjusted rearwards, it may be moved to a position which overlaps longitudinally with the front of the seat base of the passenger seats 13, 14, e.g. by up to 250 mm. This may simply involve overlap between the driver's seat back 12B and the passenger seat base (which is possible as these parts are at different heights). In some cases, it may also involve overlap between the driver's seat base 12A and the passenger seat base (which may be possible if the width of the rear of the driver's seat base 12B is narrower than a gap between the front portions of the two passenger seat bases). As shown in FIGS. 4 and 10, the occupants sit in relatively upright positions and the passengers' feet are typically on the floor 1A, 11A of the cabin immediately adjacent the position of the driver's seat base 12A. The passengers may, however, stretch their legs out further to an extent that their feet rest against the rear side of the wheel arches 9, 19. In a preferred arrangement, the legs of an adult passenger may be substantially fully extended in this position.

A further important aspect of the vehicle and seating arrangement described herein is the ease of access to the driver's seat 2, 12 and passenger seats 3, 4, 13, 14. One of the reasons why a three seat arrangement, with a centrally positioned driver's seat, has not been widely adopted is the difficulty in getting into and out of this seat as it is spaced some distance from the side of the vehicle. One way of alleviating this problem is to extend the entry door into the floor of the cabin so that when the door is opened, at least part of the floor adjacent the driver's seat is also moved. When the door is open, the driver can then position his or her feet on the ground a little closer to the driver's seat. This is the solution used in the McLaren F1 (trade mark) sports car.

In the vehicle and seating arrangement described herein, a different solution is used. As the vehicle has particular application as a compact, town car, it is important that access to all of the seats is very easy. To this end, instead of a conventional entry door, the vehicle cabin is designed so that it can be opened so that at least a portion of the roof and at least one side of the cabin are moved to a position whereby a person may enter through the side of the vehicle by stepping from the ground adjacent the vehicle onto a horizontal floor space 15A or 15B to one the side of the driver's seat 12 (and in front of the passenger seats 13, 14) and is able to stand upright or in a substantially upright position on this floor space. This means that at least part of the roof of the cabin is moved to a position so as to provide a clear space extending to a height of at least 1.75 m and preferably 1.8 m or more, above the floor space 15A and/or 15B. There are a variety of ways for achieving this. One way is for at least a portion of the cabin roof and at least a portion of one side of the cabin to open upwardly. A form of gull-wing door could, for example, be used to achieve this. Another option would be to arrange for at least a portion of the cabin roof and at least a portion of one side of the cabin to slide longitudinally.

The driver can thus stand on this floor space 15A or 15B, then lower themselves to sit on the driver's seat 12 and then swing their body around to face forwards or the driver may stand on this floor space 15A or 15B, then move their feet to the space 15C beneath the steering wheel and behind the control pedals whilst (or at the same time) lowering themselves to a seated position in the driver's seat 12.

Likewise, a passenger may step from the ground adjacent the vehicle onto the floor space 15A or 15B, turn to face forwards and then sit on the respective passenger seat 13, 14. Thus, despite being a small, compact vehicle, the arrangement provides easy access to and from all three seats, the key to this being the ability to stand in an upright (or substantially upright) position on the floor space 15A, 15B immediately adjacent the driver's seat and the passenger seats. Each of the floor spaces 15A, 15B is preferably at least 400 mm×300 mm and most preferably at least 500 mm×400 mm.

A further important consideration of the 3-seat arrangement described is the provision of seat belt mountings for each of the seats. The seat belt mountings for the passenger seats can be secured to the vehicle body in a conventional manner. However, as the driver's seat is spaced from the sides of the cabin, this is not possible for the driver's seat belt. In the McLaren F1 (trade mark) sports car, this problem was overcome by providing a monocoque body structure having structural members at the sides of the driver's seat (as there is no lateral overlap between the driver's seat and the passenger seats). In the seating arrangement described herein, the driver's seat is, instead, provided with a frame which is of sufficient strength to transfer loads applied to an upper seat belt mounting secured to the seat back, through the frame, to the seat base and hence to the floor of the vehicle.

The seating arrangements described above provide several advantages:
- the driver's seat is centrally positioned to give enhanced vision and in line controls for the driver.
- the layout of the driver's seat with the passenger seats enables a compact, but comfortable and accessible, passenger cabin to be provided.
- the seating arrangement is compact so the dimensions of the car, and its weight, can be kept to a minimum.

The invention also extends to a seating arrangement for a vehicle, said seating arrangement having at least three seats and comprising two rear passenger seats aligned substantially transversely, and a driver's seat arranged substantially centrally and in front of said two rear passenger seats, wherein said front driver's seat extends rearward beyond the front of each said rear passengers legs. As described above, the amount of the overlap D2 (see FIG. 4) will depend upon the relative sizes of the said passengers. The above embodiments have been described with particular reference to a three-seater, mid-engined vehicle. Typically, the vehicle engine is mounted in a space 20D (see FIG. 10) beneath the floor of the boot space 20A (which is typically at a similar level to the seat bases of the passenger seats 13, 14) and/or beneath the seat bases of the passenger seats 13, 14. If the vehicle has an internal combustion engine, the fuel tank is preferably mounted beneath the driver's seat and the radiator may be positioned behind the fuel tank. If the vehicle has an electric motor, the batteries or other energy source may, likewise, be mounted beneath the driver's seat. The fuel tank or other energy source is thus located on the midline of the vehicle, substantially midway between the front and rear wheels and in a low position so in a substantially ideal location for the vehicle dynamics. However, the seating arrangement described with its central driving position is advantageous in any type of vehicle, whether or not it is mid-engined.

If the length of the vehicle is not a problem, additional rear seats may be provided behind the rear passenger seats shown. Furthermore, it would be possible to provide the two rear seats in a suitably shaped bench seat, for example, connected by upholstery.

As mentioned above, the seating arrangement described is suited to a compact, town vehicle. In particular, it enables a vehicle to be constructed with an overall (external) length of 2.3 m or less and an overall (external) width of 1.25 m-4 m. This is of significance as a vehicle of these dimensions is able to file sideways into a standard UK parking spaces (which range from 4.5 m-6.6 m by 1.8 m-2.7) and it is possible to fit three such vehicles into a 4.5 m parking space side by side and four such vehicles into a 6.6 m parking space side by side (whilst still allowing sufficient space there between for the occupants to get into and out of the vehicles). It will also be appreciated that this is further enhanced if the entry door is of the type described above which opens upwards or longitudinally and thus does not extend laterally beyond the dimensions of the vehicle when opened (or does so only by a small amount).

In the closed configuration, the height of the vehicle (from the floor to the top of the roof) is preferably in the range 1.15-1.50 m and most typically around 1.4 m.

It will be appreciated that modifications in and variations to the invention as described above may be made within the scope of the present invention.

Although the present invention has been described with reference to preferred embodiments, workers skilled in the art will recognize that changes may be made in form and detail without departing from the spirit and scope of the invention.

What is claimed is:

1. A seating arrangement of a vehicle, wherein the seating arrangement has at least three seats and comprising two rear passenger seats aligned substantially transversely, and a driver's seat arranged substantially centrally and in front of said two rear passenger seats, wherein said driver's seat extends rearwards beyond the front of the legs of the rear passengers when seated in the passenger seats such that the passengers' knees substantially overlap with the driver's trunk and the driver's seat both transversely and longitudinally, in which the seats are arrangeable in multiple configurations: a three-seat configuration with a storage space behind the passenger seats, a two-seat configuration with one of the passenger seats folded down to extend said storage space and a one-seat configuration in which both passenger seats are folded down to extend further said storage space and wherein a vehicle engine is mounted in a space beneath said storage space behind the passenger seats and/or beneath the passenger seats and a fuel tank, batteries or other power source is mounted beneath the driver's seat.

2. The seating arrangement as claimed in claim 1 in which the driver's seat extends transversely so as to be positioned in front of part of each of the passenger seats.

3. The seating arrangement as claimed in claim 1 in which the back of the passenger seats each fold down to a substantially horizontal position.

4. The seating arrangement as claimed in claim 1 comprising a floor space on each side of the driver's seat and in front of the respective passenger seat, these floor spaces providing additional storage capacity in the two-seat or one-seat configurations.

5. The seating arrangement of a vehicle as claimed in claim 1 within a passenger compartment of the vehicle and in which the engine is positioned substantially immediately to the rear of the passenger compartment.

6. The seating arrangement as claimed in claim 5 in which the engine is mounted beneath a floor of the storage space behind the passenger seats.

7. The seating arrangement as claimed in claim 1 in which the engine is an internal combustion engine or is an electric motor.

8. The seating arrangement of a vehicle as claimed in claim 6 in which said floor of the storage space is at substantially the same level as seat bases of the passenger seats.

9. The seating arrangement of a vehicle as claimed in claim 1 in which the fuel tank or other power source is located on the midline of the vehicle substantially midway between the front and rear wheels of the vehicle.

10. The seating arrangement of a vehicle as claimed in claim 1 having an overall cabin width in the range 1.25 m-1.4 m and an overall length of 2.3 m or less.

* * * * *

UNITED STATES PATENT AND TRADEMARK OFFICE
CERTIFICATE OF CORRECTION

| | | |
|---|---|---|
| PATENT NO. | : 8,851,547 B2 | Page 1 of 1 |
| APPLICATION NO. | : 13/569679 | |
| DATED | : October 7, 2014 | |
| INVENTOR(S) | : Ian Gordon Murray | |

It is certified that error appears in the above-identified patent and that said Letters Patent is hereby corrected as shown below:

In the Specification

Column 1, Line 10, "PCT/EP2008/000892" should be --PCT/GB2008/000892--

In the Claims

Column 8, Line 43, "driver's trunk" should be --driver's body--

Signed and Sealed this
Second Day of June, 2015

Michelle K. Lee
*Director of the United States Patent and Trademark Office*